United States Patent [19]

Cavagna

[11] Patent Number: 4,824,428

[45] Date of Patent: Apr. 25, 1989

[54] APPARATUS FOR CUTTING AND/OR CREASING OF LAMINAR SHEET MATERIAL

[75] Inventor: Elio Cavagna, San Zenone Al Lambro, Italy

[73] Assignee: Elio Cavagna S.R.L., Milan, Italy

[21] Appl. No.: 58,689

[22] Filed: Jun. 3, 1987

Related U.S. Application Data

[63] Continuation of Ser. No. 809,072, Dec. 13, 1985, abandoned, Continuation of Ser. No. 543,764, Oct. 20, 1983, abandoned.

[30] Foreign Application Priority Data

Jan. 10, 1983 [IT] Italy .............................. 19046 A/83

[51] Int. Cl.[4] ........................ B26D 1/14; B23D 19/00; B31F 1/08

[52] U.S. Cl. ...................................... 493/370; 83/482; 493/352; 493/355; 493/360

[58] Field of Search ................. 83/482, 500, 501, 502, 83/503; 138/43, 46; 279/2 A, 4, 123; 493/352, 355, 356, 360, 370

[56] References Cited

U.S. PATENT DOCUMENTS

| | | | |
|---|---|---|---|
| 3,685,379 | 8/1972 | Frye et al. | 83/482 |
| 3,892,156 | 7/1975 | Johnstone | 83/482 X |
| 4,474,096 | 10/1984 | Muller | 83/482 |

FOREIGN PATENT DOCUMENTS

| | | | |
|---|---|---|---|
| 560262 | 3/1944 | United Kingdom | 138/43 |

*Primary Examiner*—E. Michael Combs
*Attorney, Agent, or Firm*—Collard, Roe & Galgano

[57] ABSTRACT

The present invention is related to an improvement to machines or equipments performing the cutting and/or the creasing of materials in a laminar form, used in different fields. This invention is characterized by systems or means including, in association with a bearing structure and at least an operative unit, means to regulate the flow rate of a pressurized fluid, and means to regulate and adjust the sliding guides subject to wear, particularly for torsionally stressed parts. This invention is also related to means suitable to secure good protective conditions and an airtight seal.

1 Claim, 2 Drawing Sheets

APPARATUS FOR CUTTING AND/OR CREASING OF LAMINAR SHEET MATERIAL

REFERENCE TO RELATES APPLICATIONS

This ia continuation application of application Ser. No. 809,072, filed Dec. 13, 1985, abandoned which in turn is a continuation of application Ser. No. 543,764, filed Oct. 20, 1983 abandoned.

BACKGROUND OF THE INVENTION

Field of the Invention

The present invention is relates to an improvement to machines or equipments performing the cutting and/or the creasing of materials essentially in a laminar form, used in different fields, as, by way of example, those of plastic materials, of paper and cardboard manufacturing, of the textile industry, and so forth.

SUMMARY OF THE INVENTION

Said improvement consists mainly in the combination and/or co-operation of different means, devices, operative and/or structural units applied to the equipment, which, from here on, will be called, in the most ample meaning of the term, with the work "machine". Said means include, typically but not exclusively or critically, devices to regulate or adjust known systems of blades and counterblades, and also to lock and position the operative units on the so called "beam" with one or more of the structural parts of the machine.

The improvement is also related to the means providing an hermetical seal and/or to other necessary or at least convenient means to secure good operative conditions and the desired functional efficiency of the machine.

Advantageously, the improvement is also related to the piping or conveyance systems of the pressurized fluid (generally air) for the feeding of the various devices related to the invention. Advantageously the distinctive feature of this invention is that said systems or means and/or units are provided, in connection with at least a bearing structural unit and at least an operative unit, with means to control the flow rate of the pressurized fluid or fluids, and also with adjustable guiding means for the parts subject to wear, particularly when torsional stresses are applied. The improvement comprises also means to secure suitable conditions of hermetical seal between the component parts, as at least one part operates in airtight conditions relative to another part, generally stationary.

The improvement according to this invention is besides characterized in that the control means of the fluid pressure include a system corresponding to a valve operating an adjustment or regulation of at least one passage section of the pressurized fluid. Preferably, said adjustment or regulation is obtained modifying the engagement degree of helicoidal means, providing so the regulation of the section available for the passage of said fluid, said engagement being obtained in an adjustable way using helicoidal means (practically a screw), whose thread has a truncated section, preferably in correspondence with a female component of the thread. Besides, the provided guiding means co-operating with other components, at least one of them being movable, include at least one component with a circular transverse section, partially incomplete, said component having at least one face against which is slidably applied at least one other component.

Said system is therefor equivalent to a key or spline, and consequently operates as a torsional constraint, preferably associated with regulation and/or adjustment means of said torsional constraint.

DESCRIPTION OF THE DRAWINGS

The aforesaid and other more specific characteristics of the present invention will be clearly displayed by the following detailed description, where reference is made to the attached tables of drawings, to be considered purely as examples, in which.

According to the technical expressions commonly used in this field, these devices or units may be on the whole denominated "cutting head" (or "creasing head"), since the already known cutting means operate in a equivalent way as the equally known creasing means.

Figure 1:
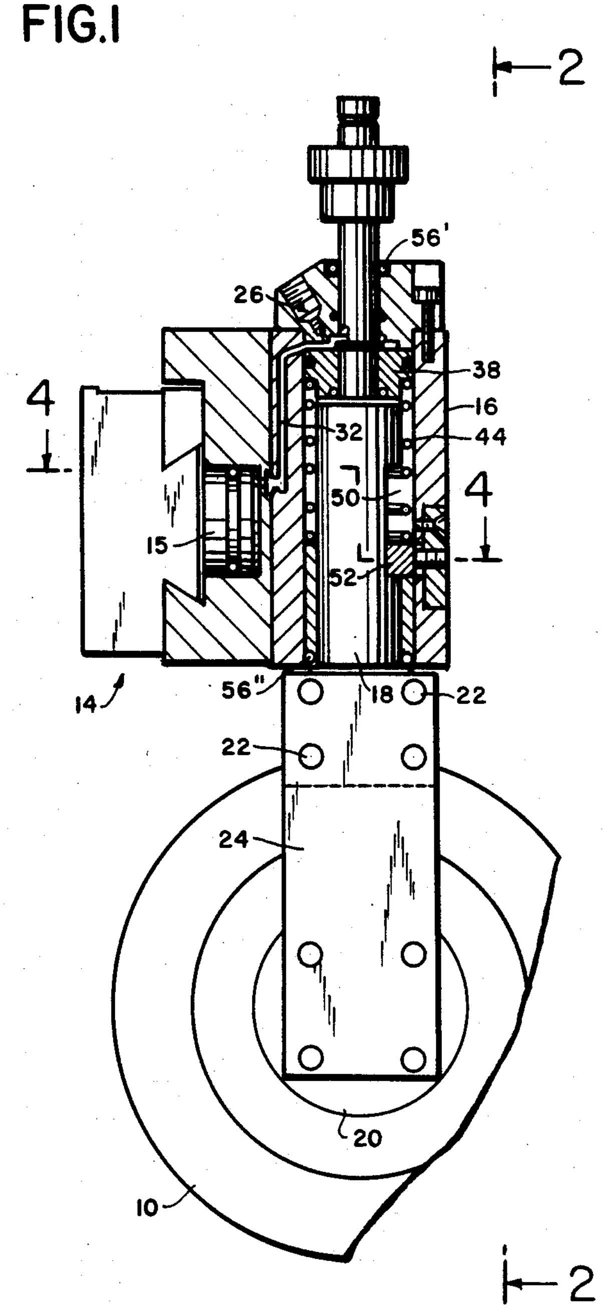
FIG. 1 represents a side view, partially in section, of an assembly including a cutting unit comprising the devices and components of major significance for an exact and complete understanding of the invention.
Figure 2:
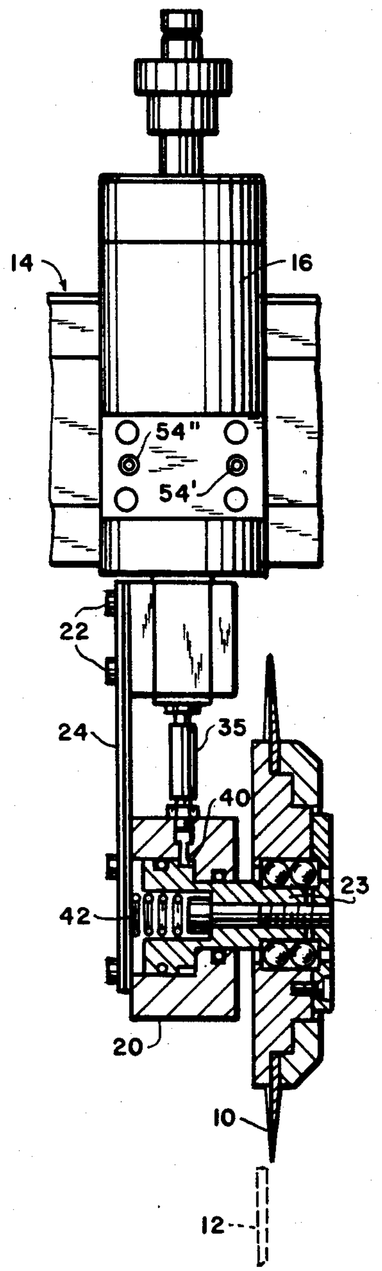

FIG. 2 represents, partially in section, the assembly of figure 1 seen in the direction defined by II in FIG. 1.

Figure 3:
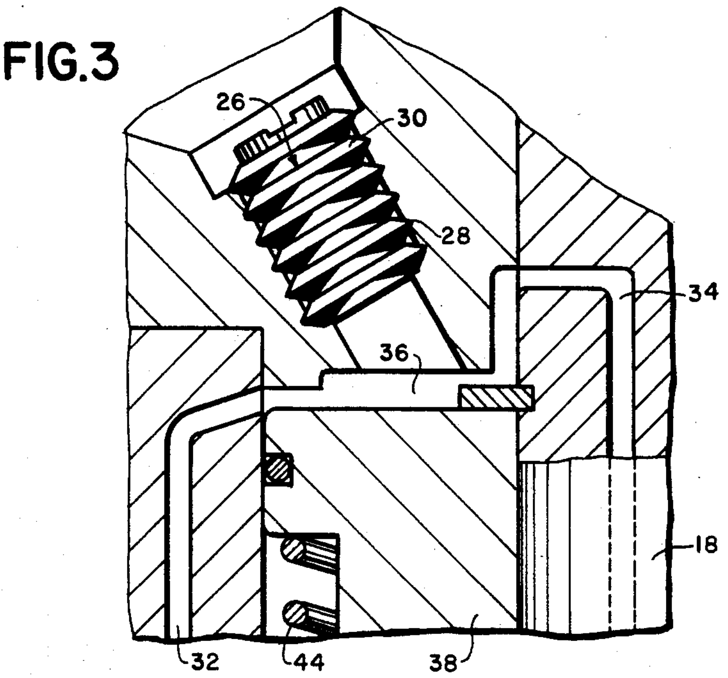

FIG. 3 represents, in a very enlarged scale, a detail of a device performing the functions of the detail included in circle III of FIG. 1, as it will later be described.

Figure 4:
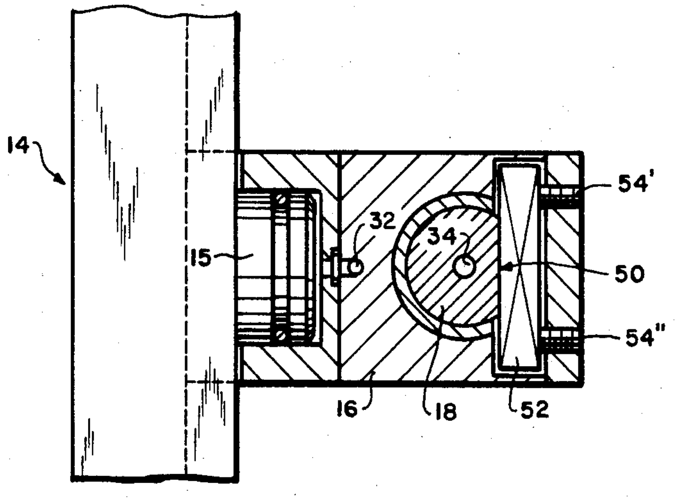

FIG. 4 represents a section, in an enlarged scale, taken along the planes and the direction defined by IV—IV in FIG. 1.

DETAILED DESCRIPTION

The aforesaid drawings, represent a cutting unit, of an already known type, provided with a circular blade 10 co-operating with a similarly known counter-blade 12 (partially shown in FIG. 2). This already known solution is similar as an example to that described and shown in the Italian Patent Application No. 22513 A/82 of the same Applicant, which is given here as integrally reproduced, and consequently no further explanation is here required. Obviously, the devices belonging to the already know techique, as are those previously described, may be subject to changes and modifications, and may be integrally or partially replaced by other device, and similarly they may be realized as described by other known technical sources of this particular field. On the whole in position 14 is exemplified a support or guide which is supposed to be structurally connected to the stationary portion of the cutting and/or creasing machine.

In a similar way, in position 16 is shown, in section, the unit carrying the shaft 18, to which is connected the cutting blade 10. In the shown example, corresponding to the already quoted prior patent application, the subassembly 20 is normally connected, by means of bolts 22, to the lower part of shaft 18 through an elastically deformable arm 24; said deformation allows the positional adjustment blade 10.

The aforesaid details are not critical, because the desired positioning may be obtained utilizing other already known means, as, by way of example, elastic means associated to the same hub 23 carrying the blade 10.

More specifically, describing the details inherent to this invention, as it may be observed in FIG. 1 and in a more detailed way in FIG. 3, the pressurized fluid, generally air, reaches through a gauged passage the ducts that will be later better described. Said gauged passage is equivalent to a regulation valve, inclusively indicated in position 26, which, in the preferred but not critical technical application, is assimilable to a male screw engaging into a female thread 28, whose profile is characteristically truncated so as its female part does not completely occupy the section of the corresponding male part of said valve 26.

The resulting passage sections may be regulated turning the male component, advantageously provided with a screw head, in such a way as to adjust the penetration of the male part into the female one with the aim of regulating the flow-rate of the incoming fluid.

The pressurized fluid, passing through said valve 26 and a sequence of passages 32, 34 and 36, performs several functions. Said fluid, through passage 32 locks the unit in the selected position on the guide 14, exerting a pressure on piston 15. Through passage 36, another portion of the fluid exerts a pressure on the head 38 of shaft 18, acting as a piston, which is therefore pushed in a downward direction, (in the non limitative disposition of figure 1). The remaining portion of the fluid reaches, through the passage 34 and the connection 35, the chamber 40 formed in the enlarged end of hub 23, which carries the blade 10 and assures the operative positioning of said blade relative to counterblade 12. Said pressurized fluid may be fed through one or more separate pipings attached or not and structurally associated to the machine, said feeding being not represented in the attached drawings, as it belongs to already known techniques.

Advantageously, the downward and transverse movements of the assembly including hub 23 carrying the blade, are respectively opposed by means, preferably elastic, as the springs 42 and 44, obviously replaceable by other return means.

As shown particularly in FIG. 4, shaft 18 has at least partially an incomplete circular section, as it has, along a generatrix, a plane face 50; against said face is positioned a component 52, normally stationary, which prevents any rotary motion of said shaft.

Advantageoulsy, to eliminate the unavoidable clearances resulting from wear, the position of aid key 52 is adjustable by acting on grub screws 54' and 54".

Finally, to prevent the dust, both the atmospheric one and chiefly that generated by the manipulation an the cutting of the materials, from reaching the surface of shaft 18, subject to vertical movements, sealing means are provided, namely gaskets of a known type 56' and 56", made of elastomeric material. In the assembly previously described, a particular evidence has been given to the means providing the torsional constraint, the protective means (gaskets) against the foreign matter, particularly resulting from the cutting operation of manufactured articles, and to the "valve" for the metered admission of the pressurized fluid; the combination of said elements, also possibly partially, dissociated, is of extreme importance to get a satisfactory efficiency from the afore described machine, and also from a machine only partially equivalent to it. Since however the unit (or the units) has been described and illustrated only as an indicative but not limitative example, the same may be realized in a structurally different form, but always maintaining the characteristics previously stated, (particularly those related the means for the regulable flow of the fluid or fluids, to the sealing means, to the means provided as a constraint for the torsional stresses, etc.), without leaving the field of the present industrial patent, or anyway of one whatsoever of the characteristics defined in the claims which follow.

What I claim is:

1. In an apparatus for cutting or creasing sheet material comprising a support beam, a rotatable blade cooperating with a counter-blade, an operative unit movable mounted on said support beam for operating said rotatable blade to engage with said counter-blade by vertical and horizontal movement of said rotatable blade, means for locking said operative unit on said support beam to prevent movement thereof, a first fluid pressure system for operating said locking means, a second fluid pressure system for acting on said operative unit to impart vertical movement to said rotatable blade, a third fluid pressure system for acting on said operative unit to impart horizontal movement to said rotatable blade, and regulating valve means in said fluid pressure systems to regulate the flow rate of the pressurized fluid, the improvement consisting in that:

the regulating valve means comprising a valve which includes a helicoidal means for the passage of said pressurized fluid and consists of a male screw engaging into a female thread, said female thread having a truncated profile so that same male thread does not completely occupy said female thread thereby forming a passage for the pressurized fluid which may be regulated by adjusting the extend of longitudinal penetration so as to regulate the flow rate and the same valve regulates the flow rate of the pressurized fluid for the first, second and third fluid pressure systems.

* * * * *